Patented May 2, 1933

1,907,201

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

CHEMICAL MODIFICATION OF CELLULOSE FIBER

No Drawing.  Application filed February 20, 1930.  Serial No. 430,147.

Various types of cellulose fibers may be used as raw material for conversion into cellulose derivatives, but those which give derivatives of the best quality are high in alpha cellulose and low in non-alpha cellulose components, such as beta and gamma celluloses, lignin, pentosans, and resins. There are, however, cellulose fibers such as cotton or refined wood pulps which, despite their high alpha cellulose contents, are not perfect raw materials for conversion into cellulose derivatives, because of their high solution viscosities, i. e., the high viscosity of solution of the derivatives. Hence it is frequent practice in the preparation of derivatives intended for the manufacture of such products as artificial silks, lacquers, and films to subject the cellulose fiber to chemical treatment capable of lowering its solution viscosity. Such chemical treatment is sometimes so drastic that it causes marked degradation of the fiber into such products as oxycelluloses, which react with and consume converting chemical to produce undesirable side reaction products in the derivative. For instance, in the viscose-rayon industry it is the custom to soak the cellulose fiber in mercerizing caustic soda solutions and then to age the so-called alkali cellulose under controlled temperature conditions. Even under such conditions, however, serious degradation of the fiber takes place over the 48-hour or longer ageing period usually employed to produce cellulose capable of xanthation into viscose syrup of a viscosity sufficiently low to be successfully spun.

In accordance with the present invention, cellulose fiber may be chemically modified into a product not only of high alpha cellulose content but of low solution viscosity. Such a product may be converted into various cellulose derivatives, such as the nitrates, acetates, and xanthates, which are of high purity and stability and form solutions of low viscosity, so that no special treatment of the derivatives prior to its solution is necessary. The chemically modified fiber of the present invention may be converted into cellulose nitrate of so-called half-second variety or of even lower viscosity, or it may be combined with caustic soda into an alkali cellulose, which requires no ageing to be xanthated into spinnable viscous syrups.

The process of the present invention comprises the mercerization of the fiber, followed by partial hydrolysis of the mercerized product. The mercerizing treatment causes a pronounced lowering of the solution viscosity of the fiber, but the value reached by such a treatment in a practical period of time is somewhat higher than that desired in the industry. The final reduction in solution viscosity to the value desired is effected by hydrolysis, which need not be so drastic as to cause considerable chemical injury to the fiber or loss of raw material, as the mercerized fiber is highly sensitive to hydrolysis by comparatively mild chemical treatments. The mercerizing treatment may be carried out conveniently and to good advantage by suspending the fiber as pulp in a bath of mercerizing caustic soda solution, as under these conditions the fiber is uniformly mercerized, its solution viscosity reduced, and non-alpha cellulose components reacted upon and dissolved therefrom to produce in a comparatively short period of time from a low grade raw material, such as unrefined wood pulp, a mercerized fiber of high alpha cellulose content and of low viscosity. When this low solution viscosity value is reached, it is comparatively easy to effect a hydrolysis of the fiber to the final solution viscosity value desired, with little degradation of the fiber, as only mild hydrolysis is necessary. Various hydrolyzing treatments may be used, but in order to effect the desired hydrolysis in a reasonable period of time and at the same time to preserve the alpha cellulose content of the fiber at a high value, some treatments must be carried out at elevated temperature conditions, while others must be carried out at room temperature or even lower. Thus, the desired hydrolyzing treatment may be effected with solutions of various acid, neutral, or basic materials, or even with water alone, if a proper temperature of treatment is used in any case.

Cellulose fibers of diverse origins and in various conditions of purity may be used as a raw material in the process of the present invention. For example, one may start with such fibers as cotton, linen, refined wood pulp, or the usual wood pulps such as sulphite, kraft, soda, or ground-wood, either in bleached or unbleached condition. When a raw or unbleached pulp, such as kraft or sulphite, is the raw material, it is of advantage to treat the fiber with chlorine water, which acts to dissolve a portion of ligneous and other coloring matter, or to chlorinate such matter into products which are readily soluble in caustic soda solution. Assuming that a raw kraft pulp of the usual commercial variety is employed as a raw material, it may be treated with chlorine water containing about 5% to 8% chlorine, based on the weight of dry pulp. This treatment may be carried out at room temperature for about two to four hours, at the end of which time practically all the chlorine has been consumed by reaction, whereupon the pulp is washed. If desired, the fiber may be digested in a weakly alkaline solution at elevated temperature and then washed so as to dissolve chlorine reaction products and thus to conserve the alkali of the mercerizing solution for reaction only upon difficultly removable impurities present in the pulp.

The refined pulp is then digested in a mercerizing solution of caustic soda. Digestion may, for instance, be carried out in a caustic soda solution of 18% strength at about 20° C., but weaker solutions may be used if they are at temperatures sufficiently low to effect mercerization. The mercerizing solution is particularly effective in dissolving pentosans from the fiber, so that if the treatment is continued for sufficient time, practically all the pentosans are removed. The treatment may be continued for one to eight hours, depending upon the purity of mercerized product desired. The mercerized fiber is then washed, but if hydrolysis is to be effected in a weakly alkaline solution, sufficient residue of alkali is preferably left therein during washing to produce the desired alkalinity of solution, say, a solution of 0.1% to 0.2% caustic soda. When the fiber is digested in the weakly alkaline solution at about 150° C., it undergoes progressive hydrolysis to the desired low viscosity value, with little reduction in its alpha cellulose content.

Digestion of the mercerized fiber at elevated temperature may be effected in solutions of basic materials other than caustic soda, such as sodium carbonate, magnesium sulphite, sodium phosphate, borax, or soap, or in suspensions of relatively insoluble basic materials, such as magnesium carbonate or magnesium hydroxide. For instance, an eminently satisfactory product was obtained by digesting the mercerized fiber in an aqueous suspension of 0.5% magnesium carbonate at a temperature of 175° C. Evidently the slightly basic magnesium carbonate neutralizes acidity generated by the hydrolysis of the fiber, and thus avoids either a distinctly acid or alkaline condition in the fiber.

The most preferred hydrolyzing effect is that obtained by the action of water upon the fiber at temperatures above 150° C., as the desired lowering of solution viscosity may be attained at such temperatures while maintaining the alpha cellulose content of the fiber even as high as at 96% to 98%. The lack of an added hydrolyzing agent is offset by the very high temperatures employed, which promote hydrolysis sufficiently to produce the desired lowering of solution viscosity in a reasonable period of time, for instance in from four to eight hours. There is generated during such water digestion a slight amount of organic acid, which evidently promotes hydrolysis. The presence of various salts, such as sodium sulphite, sodium sulphate, sodium chloride, and zinc chloride in the water in some cases accelerates hydrolysis without materially affecting the alpha cellulose content of the fiber. Solutions of, say, from 1% to 5% of these salts may be used to shorten the time of treatment.

The hydrolysis of the fiber is greatly favored by the use of acid solutions, but when using such solutions care must be taken to inhibit the rate of hydrolysis so as not to injure the fiber materially. Inasmuch as the rate of hydrolysis is accelerated by increasing the acidity of the solution and by raising the temperature, high temperatures of treatment should be employed only with exceedingly dilute or weak acid solutions, but these temperatures are lower than those found necessary when water or solutions of neutral salts are used. Various organic acids, such as acetic, oxalic, and lactic, inorganic acids, such as carbonic, phosphoric, hydrochloric, and sulphuric, and acid salts, such as bisulphates or bisulphites, may be employed for the acid hydrolyzing treatment. Along with the acid may be present reducing agents such as sulphites, sulphides, hydrogen sulphide, hydriodic acid, colloidal metals, etc., which appear to retard the formation of oxycelluloses. In some cases, however, it may be preferable to add oxidizing agents, such as nitric acid, chlorine, and permanganate, which at comparatively low temperatures accelerate hydrolysis without a too drastic action on the cellulose. When a solution of an acid salt such as sodium bisulphate or sodium bisulphite is employed, the strength of the solution may be from 0.1% to 1.0%, and the hydrolyzing treatment may be carried out at from 100° to 150° C. Solutions of straight mineral acids, such as hydrochloric, are much more reactive on the cellulose and hence must be used in dilute condition at high temperatures. Little reduction in alpha cellulose content of the fiber takes place if digestion is effected in a 0.02% solution of hydrochloric acid at 100° C. for six hours. Some mercerized pulps will stand up fairly well in respect to alpha cellulose content even when digested in 0.1% hydrochloric acid solution. Other mercerized products are less resistant and undergo transformation to beta cellulose to a larger degree. It is interesting to note that when the mercerized fiber is hydrolyzed and when hydrolyzing conditions are such as to lower alpha cellulose content, the transformation of alpha to beta cellulose is much more pronounced than is the degradation to gamma cellulose. This is of significance, inasmuch as degradation of cellulose by oxidants such as bleach will generally cause a profound increase in gamma cellulose, which is comparatively useless and, in fact, objectionable in pulps to be used for esterification. When using comparatively concentrated solutions of strong mineral acids, for instance sulphuric acid solutions of 10% strength or greater, the temperature of hydrolyzing treatment necessary to avoid considerable attack upon the fiber may be 50° C., or lower.

The hydrolyzed product is washed and, if slightly stained, may be brought to the desired whiteness by treatment with a bleaching liquor containing only a small amount of bleach, such as permanganate, chlorine, or hypochlorite. The product is eminently suitable for use in the preparation of cellulose derivatives intended for the manufacture of such products as artificial silks, lacquers, and films. The product responds more readily to xanthation than the usual fibers employed as raw material. For instance, it may be xanthated in the presence of caustic soda solutions of less than the usual 18% strength and the requisite amount of carbon bisulphide or by independent treatment with such solutions and then with carbon bisulphide. Some products undergo complete xanthation in the presence of as low as 10% caustic soda solution, under which condition the usual raw materials, such as sulphite pulp, cotton, or refined wood pulp would undergo such incomplete xanthation that only about 15% of the cellulose used in the reaction would go into solution.

The process hereinbefore described is subject to modifications other than those already indicated. For instance, the mercerizing solution may to advantage contain either reducing agents or oxidizing agents. The presence of reducing agents such as sodium sulphide or sodium sulphite appears to improve the yield of mercerized product and at the same time to retard the formation of oxycelluloses. The presence of oxidizing agents such as hypochlorite, permanganate, or the bubbling of air or oxygen through the fiber suspended in the mercerizing liquor enhances the reduction in solution viscosity which attends mercerization, but the presence of too much oxidant is generally undesirable, because it reduces the yield. If desired, rather than washing the fiber immediately after mercerization, it may be squeezed free of excess liquor to produce an alkali-cellulose, which may be aged as in the viscose-rayon process for the desired period of time. When ageing is effected, it is preferable that the alkali cellulose is free from reducing agents which have the effect of retarding a lowering of solution viscosity, but the alkali cellulose may contain suitable oxidizing agents which accelerate the lowering of solution viscosity at the sacrifice of some alpha cellulose.

The advantages of a process such as described may best be appreciated by observing the characteristics of a raw material, such as kraft pulp, during various stages of the process. A usual commercial kraft pulp will have approximately the following characteristics:

Alpha cellulose content_____ 88% to 90%
Pentosan content_____ 7% to 10%
Solution viscosity_____ above 50

The mercerized pulp, when subjected to a chlorine-water pretreatment, as hereinbefore described, may have the following characteristics:

Alpha cellulose content____ 97 % to 99 %
Pentosan content_____ 0.6% to 1.5%
Solution viscosity _____ 0.6 to 2.0

If mercerization has been followed by ageing, particularly in the presence of oxidants, the alpha cellulose content may be somewhat lower than the values hereinbefore given, but the solution viscosity may be as low as 0.3. In any event, pentosans, which are highly undesirable in the production of some esters, have been eliminated from the pulp. Even if, as a result of ageing, the alpha cellulose content goes down as low as 90%, this reduction is not serious, as the alpha cellulose is converted merely into beta and gamma celluloses, which are less objectionable than pentosans. The usual ageing procedure will result in a product having an alpha cellulose content ranging from 90% to 96%.

After hydrolysis, the fiber may have an alpha cellulose content of from 90% to 98%, and a solution viscosity of about 0.2 to 0.1, or even lower, the particular characteristics in any case depending upon the conditions under which hydrolysis has been effected. It is possible, however, to control hydrolysis to produce a product having the desired characteristics by selecting a suitable hydrolyzing agent and the proper temperature and time of treatment. The process of the present invention thus makes possible the modification of cellulose fiber into a product of exceedingly low solution viscosity and in the case of many raw pulps into products of an alpha cellulose content higher than that of the raw pulps used as the starting material. However, even when the modified product is not of higher alpha cellulose content than the starting materials, its non-alpha cellulose components consist largely of less resistant celluloses, including largely beta cellulose rather than gamma cellulose, which are less objectionable than the pentosans and resins which may constitute a large fraction of the impurities present in the starting material.

As will appear to those skilled in the art, the severity of the mercerizing treatment and the subsequent hydrolyzing treatment will depend upon the condition of the pulp immediately before these treatments. For example, a pulp which has been subjected to intensive chemical refining is high in alpha cellulose content and has a comparatively low solution viscosity and thus need not be suspended in the mercerizing liquor for as long a period of time as a raw pulp such as kraft, sulphite, or ground-wood. If it is suspended in the mercerizing liquor for as long a period of time as a raw pulp, the subsequent hydrolyzing treatment may be much milder than that necessary in the case of a raw pulp, in order to attain a given low solution viscosity value.

My theory is that the hydrolyzing treatment which is accompanied by a lowering of the solution viscosity of the fiber causes a disruption of the cellulose molecule into smaller molecules, this change in the cellulose molecule being reflected in a lower viscosity of a solution of the resulting cellulose derivative. The hydrolyzing treatments which I prefer are evidently those which do not carry this disruption of the molecule so far as to give rise to much cellulose incapable of resisting the solvent action of caustic soda and which are hence classified as less resistant celluloses.

I have herein spoken of "solution viscosity" and have ascribed definite solution viscosity values to cellulose fiber. This term indicates the viscosity of a cellulose derivative solution preparable from the fiber. The solution herein employed as a standard is the usual one, namely, a cuprammonium cellulose solution of prescribed cellulose concentration, the viscosity being determined by measuring the time of efflux of a definite volume of such solution under standard conditions, through an orifice of standard size. The solution viscosity is herein given in absolute C. G. S. units, as is determined by measuring the viscosity of a solution of 6 grams of fiber in a cuprammonium solution composed of 225 cc. of 28% ammonia water containing 9 grams of cuprous oxide. The C. G. S. unit is employed because it is definite, denoting a viscosity one hundred times that of water at 20° C., wherefore a cuprammonium cellulose solution of standard composition by which a fiber is identified as having a viscosity of 10 is one thousand times as viscous as water at 20° C.

I claim:

1. A mercerized and hydrolyzed cellulose fiber having an alpha cellulose content of above 90% and a solution viscosity of less than 0.5.

2. A mercerized and hydrolyzed fiber having an alpha cellulose content of about 96% to 98% and a solution viscosity of less than 0.5.

3. A process which comprises mercerizing cellulose fiber, and then digesting the mercerized fiber in water at temperatures above 150° C. but below such as will cause a material reduction in its alpha cellulose content.

4. A process which comprises suspending cellulose fiber in a mercerizing caustic soda solution, washing the fiber free from most of the caustic soda, and digesting the partially washed fiber at about 150° C. in a solution of the residual caustic soda until its solution viscosity has been reduced to less than 0.5.

5. A process which comprises mercerizing cellulose fiber, then digesting the mercerized fiber in a basic solution at temperatures above about 150° C. but below such as will cause a material reduction of its alpha cellulose content, and continuing such digestion until the solution viscosity of the fiber has been reduced to a value of less than 0.5.

In testimony whereof I have affixed my signature.

GEORGE A. RICHTER.